US009473826B2

(12) United States Patent
Kakani et al.

(10) Patent No.: US 9,473,826 B2
(45) Date of Patent: Oct. 18, 2016

(54) METHOD AND APPARATUS FOR INSERTION OF ADVERTISING IN A LIVE VIDEO STREAM

(75) Inventors: Srikanth Kakani, Fremont, CA (US); Chhavi Upadhyay, Fremont, CA (US); Prashant Pandey, San Jose, CA (US); Satyam Soni, New Delhi (IN); Abhay Kumar Singh, Faridabad (IN); Pushpender Singh, New Delhi (IN)

(73) Assignee: VDOPIA INC., San Jose, CA (US)

( * ) Notice: Subject to any disclaimer, the term of this patent is extended or adjusted under 35 U.S.C. 154(b) by 127 days.

(21) Appl. No.: 12/770,454

(22) Filed: Apr. 29, 2010

(65) Prior Publication Data

US 2011/0271299 A1    Nov. 3, 2011

(51) Int. Cl.
| H04N 7/10 | (2006.01) |
| H04N 21/81 | (2011.01) |
| H04N 21/234 | (2011.01) |
| H04N 21/44 | (2011.01) |

(52) U.S. Cl.
CPC ...... *H04N 21/812* (2013.01); *H04N 21/23424* (2013.01); *H04N 21/44016* (2013.01)

(58) Field of Classification Search
CPC .................. H04N 21/23424; H04N 21/44016; H04N 21/812
USPC ........ 725/32, 34–36; 705/14.4, 14.49, 14.61, 705/14.66, 14.67
See application file for complete search history.

(56) References Cited

U.S. PATENT DOCUMENTS

| 9,098,868 | B1 * | 8/2015 | Issa ..................... G06Q 30/0272 |
| 2001/0023436 | A1 * | 9/2001 | Srinivasan et al. ........... 709/219 |
| 2002/0162115 | A1 * | 10/2002 | Bruckner ........... H04N 7/17318 725/105 |
| 2005/0102700 | A1 * | 5/2005 | Cormack et al. ............. 725/100 |
| 2005/0204381 | A1 * | 9/2005 | Ludvig et al. .................. 725/34 |
| 2006/0075449 | A1 | 4/2006 | Jagadeesan et al. |
| 2008/0127252 | A1 * | 5/2008 | Eldering et al. ................ 725/34 |
| 2009/0094639 | A1 | 4/2009 | Haberman et al. |
| 2009/0199236 | A1 * | 8/2009 | Barrett et al. .................. 725/36 |
| 2009/0320063 | A1 * | 12/2009 | Barrett ............................ 725/34 |

FOREIGN PATENT DOCUMENTS

JP        2003-058774 A       2/2003

OTHER PUBLICATIONS

PCT International Search Report and the Written Opinion mailed Nov. 28, 2011, in related International Application No. PCT/US2011/033732.
PCT International Preliminary Report on Patentability mailed Nov. 8, 2012, in related International Application No. PCT/US2011/033732.

* cited by examiner

*Primary Examiner* — Farzana Hossain
(74) *Attorney, Agent, or Firm* — Haynes & Boone, LLP

(57) ABSTRACT

A real time video stream production system includes: (a) an advertising insertion server receiving over a wide area network a real time video stream; and (b) an advertising controller, which receives the real time video stream from the advertising insertion server. The advertising controller has a user interface which allows an operator to cause advertising impression data available from an advertising server to be included in a modified video data stream presented to a media player client for display.

21 Claims, 2 Drawing Sheets

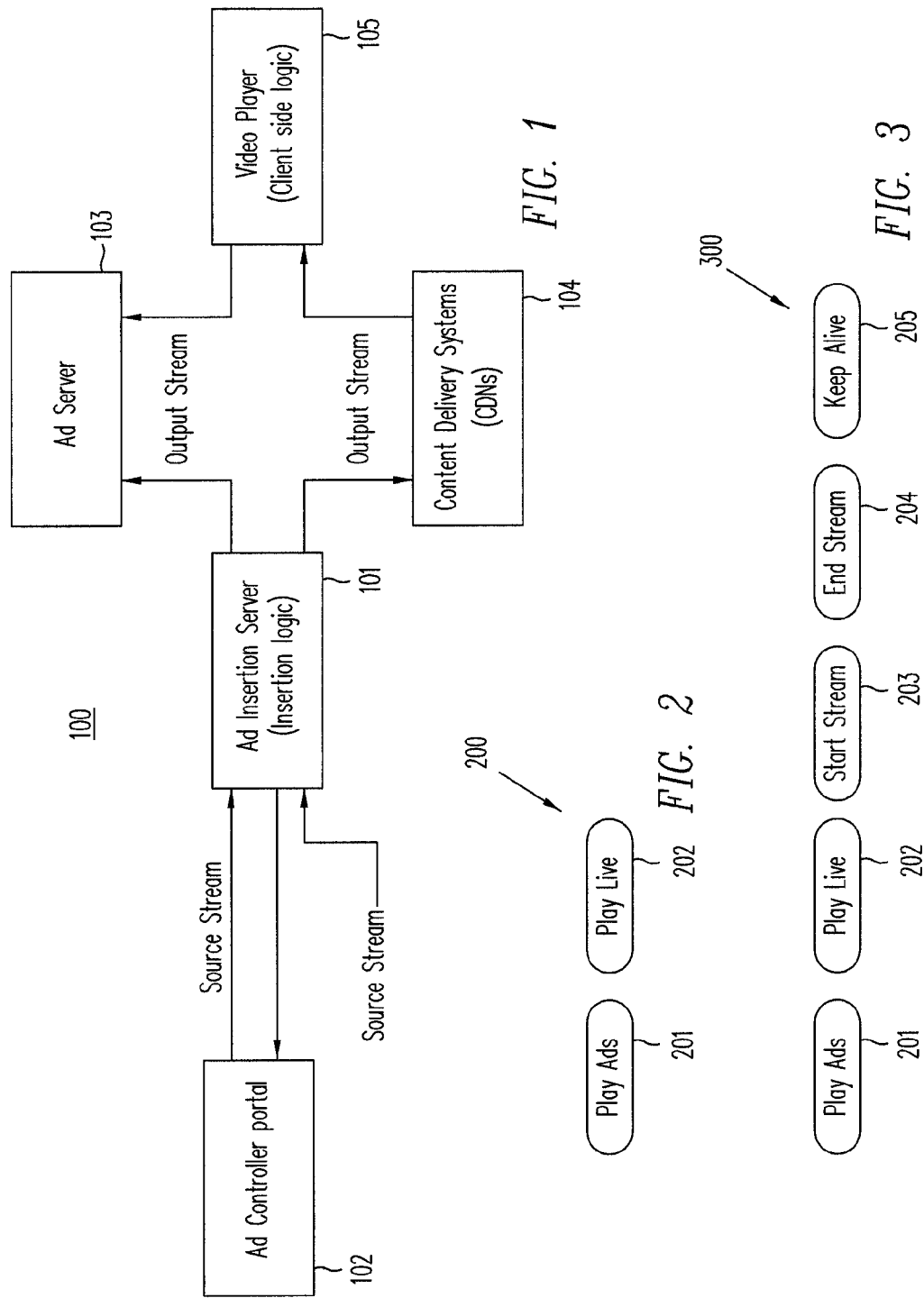

METHOD AND APPARATUS FOR INSERTION OF ADVERTISING IN A LIVE VIDEO STREAM

BACKGROUND OF INVENTION

1. Field of the Invention

The present invention relates to real time production of a video stream that is distributed over a wide area computer network. In particular, the present invention relates to inserting advertisement in a video stream (e.g., a live broadcast of a sports event) distributed over a wide area computer or communication network.

2. Discussion of the Related Art

Video delivery over the Internet to viewers throughout the world, e.g., a broadcast of a popular or important sporting event, is desirable but prohibitively expensive previously. Lower bandwidth costs have now made possible this form of entertainment. As in broadcast television, a producer of the video stream desires that the cost of producing the video stream (e.g., the cost of acquiring the broadcast rights) and a profit be realizable from the sale of advertising spots made available during the broadcast.

SUMMARY

According to one embodiment of the present invention, a real time video stream production system includes: (a) an advertising insertion server receiving over a wide area network a real time video stream; and (b) an advertising controller, which receives the real time video stream from the advertising insertion server. The advertising controller has a user interface which allows an operator to cause advertising impression data available from an advertising server to be included in a modified video data stream presented to a media player client for display.

In one embodiment, the advertising insertion server is directed by the advertising controller to retrieve the impression data from the advertising server and to replace, over a predetermined time period, the real time video stream with the retrieved impression data.

In another embodiment, the advertising insertion server is directed by the advertising controller to insert into the real time video stream a cue point for processing by, the media player client. In that embodiment, the cue point specifies impression data to be fetched from the advertising server by the media player client for inclusion in the modified video data stream.

According to a third embodiment of the present invention, the advertising insertion server is directed by the advertising controller to insert cue points into the real time video stream. The cue points indicate where a content distribution network may include impression data or a cue point in the modified video data stream.

According to a fourth embodiment of the present invention, the advertising insertion server is directed by the advertising controller to insert into the real time video stream to insert image pattern-based information for processing by the media player client. The image pattern-based information may specify, for example, impression data to be fetched by the media player client for inclusion in the modified video data stream. The image pattern-based information may include, for example, video content having a lower resolution that the resolution of the real time video stream.

According to one embodiment of the present invention, an advertising insertion server includes (a) an interface for receiving over a wide area network a real time video stream; and (b) an interface for providing an advertising controller the real time video stream and for receiving from the advertising controller directions from an operator at a user interface of the advertising controller, the directions resulting in advertising impression data available from an advertising server to be included in a modified video data stream presented to a media player client for display. In one implementation, the advertising insertion server is directed by the advertising controller to retrieve the impression data from the advertising server and to replace, over a predetermined time period, the real time video stream with the retrieved impression data.

According to one embodiment of the present invention, a media player client includes (a) an interface for receiving a video data stream, the video data stream including a cue point or an image pattern-based information specifying impression data to be displayed in place of the video data stream; and (b) an interface to an advertising server for retrieving from the advertising server the specified impression data. The image pattern-based information may include video content having a lower resolution that the resolution of the real time video stream.

According to one embodiment of the present invention, a real time video stream production system includes (a) an advertising insertion server having cache storage, the advertising insertion server receiving over a wide area network a real time video stream; and (b) an advertising controller, which receives the real time video stream from the advertising insertion server. In this embodiment, the advertising controller has a user interface which allows an operator to cause advertising impression data available from an advertising server to be included in a modified video data stream presented to a media player client for display. The advertising insertion server may cache the impression data retrieved from the advertising server in the cache storage.

According to another embodiment of the present invention, a media player client includes (a) an interface for receiving a video data stream, the video data stream including a cue point or an image pattern-based information specifying impression data to be displayed in place of the video data stream; (b) an interface to an advertising server for retrieving from the advertising server the specified impression data; and (c) cache storage for storing the specified impression data retrieved from the advertising server. In one embodiment, the media player client is provided a time for accessing the advertising server that is skewed from a time for accessing the advertising server by another media player client. In another embodiment, the media player client is provided a time for accessing the advertising server that is skewed from a time for accessing the advertising server by an advertising insertion server.

The present invention provides an innovative use of technology to provide significant revenues to the businesses involved in producing a live video feed of an ongoing event, such as a popular sporting event.

The present invention is better understood upon consideration of the detailed description below and the accompanying drawings.

BRIEF DESCRIPTION OF THE DRAWINGS

FIG. 1 shows system 100, which allows insertion of advertising into a live video feed, in accordance with one embodiment of the present invention.

FIG. 2 shows a control panel 200 through which an operator can insert impression data into the program stream, in accordance with one embodiment of the present invention.

FIG. 3 shows a control panel 200 through which an operator can insert impression data into and otherwise control the program stream, in accordance with one embodiment of the present invention.

DETAILED DESCRIPTION OF THE PREFERRED EMBODIMENTS

Figure 4:
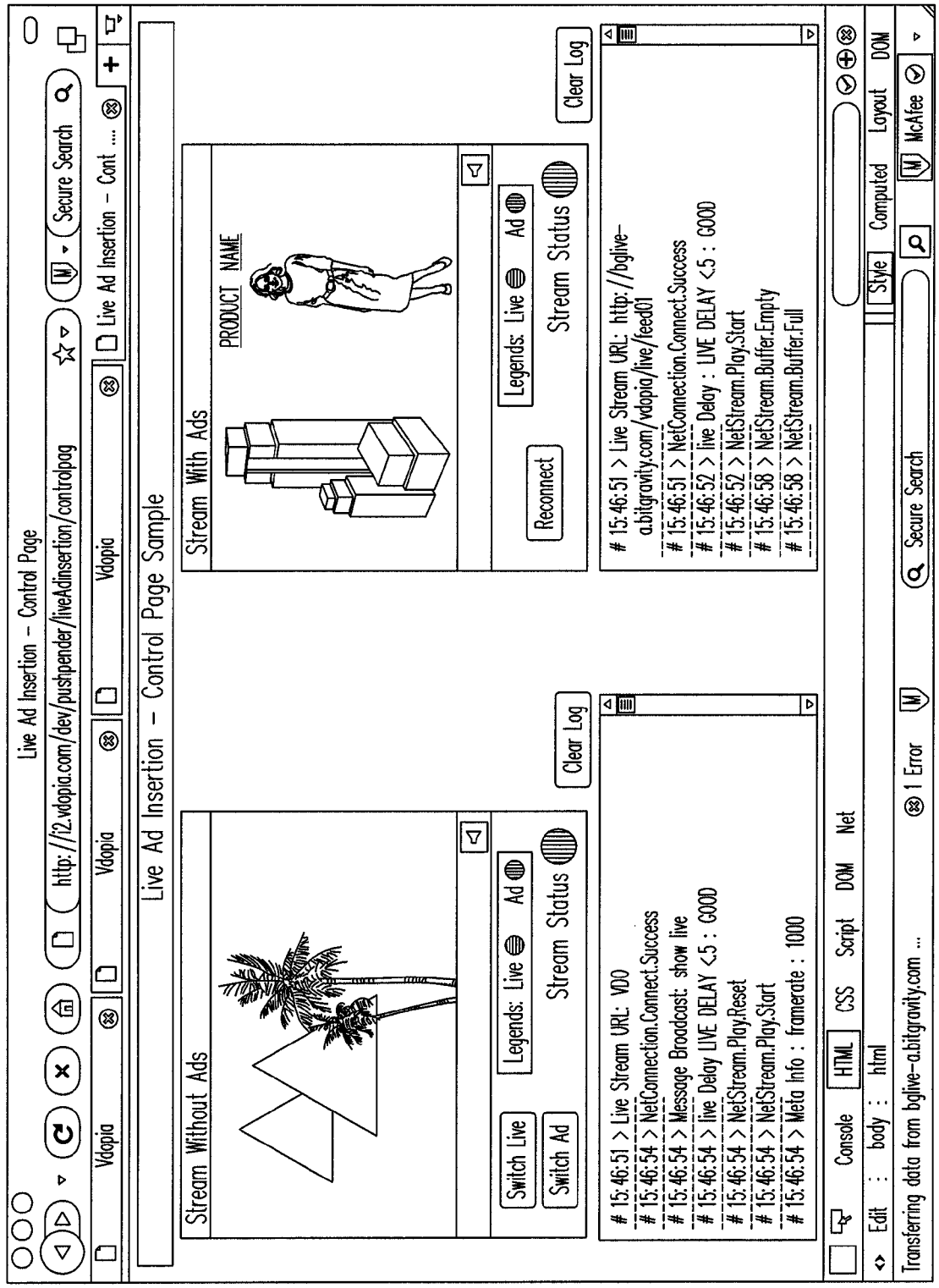
FIG. 4 shows a more advanced control panel providing a "stream status" indicator that indicates whether the live stream or the advertising stream is being broadcast.

The present invention allows inserting advertising video into a video stream of a live event, e.g., sporting event. FIG. 1 shows system 100 which allows insertion of advertising in real time into a video stream of a live event ("program stream"), in accordance with one embodiment of the present invention. As shown in FIG. 1, a program stream is provided over a computer network (e.g., the internet) to advertising insertion server 101 before the program stream is broadcast or distributed to viewers all over the world. The program stream may be provided, for example, using the real time messaging protocol (RTMP). Advertising insertion server 101 is accessible by the publisher of the program stream through controller portal 102 (which may provide, for example, a browser-based interface accessing advertising server 101 over the internet). Through advertising controller portal 102, an operator of the publisher may monitor the program stream and, at appropriate times, may insert advertising video into the program stream. Advertising controller portal 102 is preferably located a short network distance from advertising insertion server 101 to maintain a low latency. (In this detailed description, the term "publisher" refers to an originator of a video feed of an event. Such a publisher, may be, for example, (a) video services, such as YouTube, or (b) a television or video network, that has broadcast or distribution rights to the live video feed of the event or content.)

According to one embodiment of the present invention, the publisher may cause advertising to be inserted into the program stream using one or more of three mechanisms (each of which is discussed later in this detailed description): (a) direct insertion, (b) cue point insertion, and (c) image pattern-based insertion. The modified program stream after processing by advertising insertion server 101 is provided to content distribution networks ("CDNs") 104 for distribution to viewers all over the world. A CDN may be, for example, a cable television operator or a broadcast network. A viewer may access the program stream using media player client 105. Media player client 105 may be a general-purpose media player client (e.g., Itunes or Microsoft Media Player), a plug-in to a general purpose or special purpose web browser, or a special purpose media player client provided by the publisher or a third party provider, such as at a website of the publisher or third party provider.

Under the direct insertion mechanism, a direction to advertising insertion server 101 is inserted into the program stream by the operator at advertising controller 102. Upon receiving the direction, advertising insertion server 101 executes the instruction to retrieve (e.g., over the internet) advertisement content or "impression data" from advertising server 103. Advertising server 103 may be operated by the publisher or, alternatively, by a third party. The program stream is modified in advertising insertion server 101 by substituting the retrieved impression data for the program stream for a designated duration. Alternatively, data that specifies a specific advertisement ("cue point") to a viewer's media player client (e.g., media player client 105) may be inserted, instead of the actual impression data. The modified program stream is then provided to one or more CDNs 104 for distribution to viewers all over the world.

Under the cue-point insertion mechanism, advertising server 101 inserts into the program stream "cue points" that indicates to downstream programmers (e.g., CDNs 104) appropriate points in the program stream where the programmers may include their own advertising (e.g., advertising of local interest, rather national or global interest). Cue points may be implemented as "cue tones" which are designated tones included in an audio channel that serve as cues to the programmers. As the program data is expected to be replaced by impression data at these cue points prior to being displayed, the program stream at the cue points may be reduced to a low bandwidth stream, to avoid unnecessarily expending bandwidth at media player client 105. In one embodiment, "cue point" insertions can be achieved using, for example, a Flash Media Interactive Server (FMIS).

Under the image pattern-based insertion mechanism, advertising server 101 substitutes the program stream by a low resolution video data stream, which can be detected by CDNs 104 or by media player client 105 to be an indicator at which advertising may be inserted. Switching between the program stream and the impression data under the image pattern-based insertion mechanism, or the direct insertion mechanism (other than the "cue point" mechanism), may be achieved using, for example, a video stream switching system available as open source software.

Advertising controller portal 102 may provide a user interface for an operator at the publisher to control the insertion of impression data using one or more of the mechanisms discussed above. According to one embodiment of the present invention, the operator may be provided in the user interface a video player area in which the unmodified program stream can be displayed. FIG. 2 shows control panel 200 through which an operator can insert impression data into the program stream, in accordance with one embodiment of the present invention. As shown in FIG. 2, control panel 200 includes two "radio buttons" 201 and 202. Radio button 201, labeled "Play Ads," is activated ("pushed") when the operator monitoring the program stream wishes to signal to advertising insertion server 101 an insertion point for advertising. Alternatively, the operator pushes radio button 202, labeled "Play Live", to signal to advertising insertion server 101 that resumption of the program stream is desired. FIG. 3 shows a control panel 30 through which an operator can insert impression data into and otherwise control the program stream, in accordance with one embodiment of the present invention. As shown in FIG. 3, in addition to radio buttons 201 and 202 of FIG. 2, radio buttons 203-205 are provided, labeled respectively "Start Stream", "End Stream" and "Keep Alive," to provide additional control of the program stream. FIG. 4 shows a more advanced control panel providing a "stream status" indicator that indicates whether the live stream or the advertising stream is being broadcast.

According to one embodiment of the present invention, discussed earlier with respect to the direction insertion mechanism in this detailed description, media player client 105 may be directed by cue points embedded in the program stream by advertising insertion server 101 or CDNs 104 to retrieve the desired impression data from advertising server

103. Media player client 105 may also detect the low resolution data stream under the image pattern-based mechanism, When such an image pattern is detected, media player client 105 extracts from the data stream information specifying the impression data, and uses the extracted information to access advertising server 103 for the actual impression data, which is either cached or provided at the time of access. The retrieved impression data is then displayed for viewing by the viewer on media player client 105.

Advertising insertion server 101 or media player client 105, or both, may cache locally the impression data or the advertising specification, or both, to reduce response time and to reduce the bandwidth required for accessing advertising server 103. In addition, advertising insertion server 101, media player client 105 and other entities which access advertising server 103 for the impression data may be assigned different skew or delayed access times so as to spread out the required accesses to advertising server 103. Skewing of access to advertising server 103 avoids simultaneous impression data requests from advertising server 103, providing a more balanced load at advertising server 103.

The detailed description is provided to illustrate the specific embodiments of the present invention and is not intended to be limiting. Numerous variations and modifications within the scope of the present invention are possible. The present invention is set forth in the following claims.

We claim:

1. A real time video stream production system, comprising:
   an advertising insertion server that receives, over a wide area network, a real time video stream; and
   an advertising controller, which receives the real time video stream from the advertising insertion server, the advertising controller includes a user interface that allows an operator to cause image pattern-based data to be included in a modified video data stream, the image pattern-based data indicates advertising content available from an advertising server, the modified video data stream is presented to a media player client, wherein the media player client:
      retrieves the advertising content from the advertising server based on information included in the image pattern-based data and based on an assigned skewed access time to the advertising server, the assigned skewed access time provided by the advertising server and being a time for accessing the advertising server; and
      displays the advertising content.

2. The system of claim 1, wherein the advertising controller and the advertising insertion server are both provided by a common computer or software program.

3. The system of claim 1, wherein the image pattern-based data comprises video content having a lower resolution than a resolution of the real time video stream.

4. An advertising insertion server, comprising:
   an interface for receiving over a wide area network a real time video stream; and
   an interface for providing an advertising controller the real time video stream and for receiving, from the advertising controller, directions from an operator for causing image pattern-based data to be included in a modified video data stream, the image pattern-based data indicating advertising content available from an advertising server, the modified video data stream being presented to a media player client, the media player client:
      retrieving the advertising content from the advertising server based on information included in the image pattern-based data and based on an assigned skewed access time to the advertising server, the assigned skewed access time provided by the advertising server and being time for accessing the advertising server; and
      displaying the advertising content.

5. The advertising insertion server of claim 4, wherein the advertising controller and the advertising insertion server are both provided by a common computer or software program.

6. The advertising insertion server of claim 4, wherein the image pattern-based data comprises video content having a lower resolution that a resolution of the real time video stream.

7. A media player client, comprising:
   an interface for receiving a video data stream, the video data stream including image pattern-based information, the image pattern-based information specifying advertising content to be displayed in place of the video data stream; and
   an interface to an advertising server for displaying, by the media player client, the video data stream, and for retrieving, from the advertising server, the advertising content based on information included in the image pattern-based information and based on an assigned skewed access time to the advertising server, the assigned access time provided by the advertising server and being a time for accessing the advertising server.

8. The media player client of claim 7, wherein the image pattern-based information comprises video content having a lower resolution than a resolution of the video data stream.

9. A real time video stream production system, comprising:
   an advertising insertion server that includes cache storage and receives, over a wide area network, a real time video stream; and
   an advertising controller, which receives the real time video stream from the advertising insertion server, the advertising controller includes a user interface that allows an operator to cause image pattern-based data to be included in a modified video data stream, the image pattern-based data indicates advertising content available from an advertising server, the modified video data stream is presented to a media player client for display, wherein the advertising insertion server:
      retrieves the advertising content from the advertising server based on information included in the image pattern-based data and based on an assigned skewed access time to the advertising server, the assigned skewed access time provided by the advertising server and being a time for accessing the advertising server; and
      caches the advertising content in the cache storage.

10. The real time video stream production system of claim 9, wherein the advertising controller and the advertising insertion server are both provided by a common computer or software program.

11. A media player client, comprising:
    an interface for receiving a video data stream, the video data stream including an image pattern-based information specifying advertising content to be displayed in place of the video data stream;
    an interface to an advertising server for retrieving, from the advertising server, the advertising content based on information included in the image pattern-based information and based on an assigned skewed access time to the advertising server, the assigned skewed access time provided by the advertising server and being time for accessing the advertising server; and cache storage for storing the advertising content.

12. The media player client of claim 11, wherein the media player client is provided a time for accessing the advertising server that is skewed from a time for accessing the advertising server by another media player client.

13. The media player client of claim 11, wherein the media player client is provided a time for accessing the advertising server that is skewed from a time for accessing the advertising server by an advertising insertion server.

14. A method for processing a real time video stream, comprising:

receiving, at an advertising insertion server, the real time video stream over a wide area network;

providing, from the advertising insertion server, the real time video stream to an advertising controller;

providing, at the advertising controller, a user interface that allows an operator to cause advertising content to be included in a modified video data stream, the advertising content being available from an advertising server, the advertising controller directing the advertising insertion server to insert, into the real time video stream, image pattern-based information for processing by a media player client, the image pattern-based information specifying advertising content to be retrieved by the media player client for inclusion in the modified video data stream;

retrieving, by the media client player, the modified video data stream from the advertising insertion server;

retrieving, by the media client player, the advertising content based on information included in the image pattern-based information and based on an assigned skewed access time to the advertising server, the assigned skewed access time provided by the advertising server and being time for accessing the advertising server; and displaying, by the media client player, the modified video data stream including the specified advertising content.

15. The method of claim 14, wherein the image pattern-based information comprises video content having a lower resolution that a resolution of the real time video stream.

16. A method for live video processing in a media player client, comprising:

receiving a video data stream, the video data stream including image pattern-based information, the image pattern-based information specifying advertising content to be displayed in place of the video data stream;

retrieving, from an advertising server, the specified advertising content based on information included in the image pattern-based information and based an assigned skewed access time to the advertising server, the assigned skewed access time provided by the advertising server and being a time for accessing the advertising server; and displaying, by the media player client, the video data stream.

17. The method of claim 16, wherein the image pattern-based information comprises video content having a lower resolution that a resolution of the video data stream.

18. A method for producing a real time video stream, comprising:

providing cache storage in an advertising insertion server;

receiving, at the advertising insertion server, a real time video stream over a wide area network;

receiving, at an advertising controller, the real time video stream from the advertising insertion server;

providing, at the advertising controller, a user interface that allows an operator to cause image pattern-based data to be included in a modified video data stream presented to a media player client, the image pattern-based data specifying advertising content available from an advertising server;

retrieving the advertising content from the advertising server based on information included in the image pattern-based data and based on an assigned skewed access time to the advertising server, the assigned skewed access time provided by the advertising server and being a time for accessing the advertising server; and caching the advertising content in the cache storage.

19. A method for processing a real time video stream in a media player client, comprising:

receiving a video data stream, the video data stream including image pattern-based information, the image pattern-based information specifying advertising content to be displayed in place of the video data stream;

retrieving, from an advertising server, the advertising content based on information included in the image pattern-based information and based on an assigned skewed access time to the advertising server, the assigned skewed access time provided by the advertising server and being a time for accessing the advertising server; and caching in a cache storage the advertising content retrieved from the advertising server.

20. The method of claim 19, wherein the media player client is provided a time for accessing the advertising server that is skewed from a time for accessing the advertising server by another media player client.

21. The method of claim 19, wherein the media player client is provided a time for accessing the advertising server that is skewed from a time for accessing the advertising server by an advertising insertion server.

* * * * *